United States Patent
Uhlik et al.

(10) Patent No.: US 7,406,315 B2
(45) Date of Patent: Jul. 29, 2008

(54) METHOD AND APPARATUS FOR RESOURCE MANAGEMENT IN A WIRELESS DATA COMMUNICATION SYSTEM

(75) Inventors: Christopher Richard Uhlik, Danville, CA (US); Mitchell D. Trott, Mountain View, CA (US); Douglas C. Dahlby, Fremont, CA (US); Stephen D. Fleischer, Mountain View, CA (US)

(73) Assignee: ArrayComm LLC, San Jose, CA (US)

( * ) Notice: Subject to any disclaimer, the term of this patent is extended or adjusted under 35 U.S.C. 154(b) by 35 days.

(21) Appl. No.: 09/813,386

(22) Filed: Mar. 20, 2001

(65) Prior Publication Data
US 2002/0147019 A1    Oct. 10, 2002

(51) Int. Cl.
*H04Q 7/20*    (2006.01)
(52) U.S. Cl. .................................. 455/452.1; 455/527
(58) Field of Classification Search .............. 455/452.1, 455/415, 434, 452, 453, 422, 63, 67.1, 426, 455/529, 511, 435.2, 425.2, 73, 88, 436, 455/432.1, 433, 438, 439, 403, 450, 425, 455/527; 370/448, 444, 445, 394, 347, 442
See application file for complete search history.

(56) References Cited

U.S. PATENT DOCUMENTS

| | | | |
|---|---|---|---|
| 5,533,025 A * | 7/1996 | Fleek et al. ................. 370/85.2 |
| 6,058,305 A | 5/2000 | Chavez, Jr. | |
| 6,064,890 A | 5/2000 | Hirose et al. | |
| 6,094,575 A | 7/2000 | Anderson et al. | |
| 6,212,408 B1 | 4/2001 | Son et al. | |
| 6,374,112 B1 * | 4/2002 | Widergren et al. ........... 455/452 |
| 6,408,003 B1 * | 6/2002 | Rezalifar et al. ............. 370/394 |
| 6,414,938 B1 * | 7/2002 | Corke et al. ................. 370/231 |
| 6,587,985 B1 * | 7/2003 | Fukushima et al. .......... 714/748 |
| 6,804,520 B1 * | 10/2004 | Johansson et al. ............ 455/450 |
| 2002/0087716 A1 * | 7/2002 | Mustafa ....................... 709/236 |
| 2002/0146129 A1 * | 10/2002 | Kaplan ........................ 380/270 |
| 2003/0169722 A1 * | 9/2003 | Petrus et al. ................. 370/347 |

* cited by examiner

*Primary Examiner*—Melody Mehrpour
(74) *Attorney, Agent, or Firm*—Blakely Sokoloff Taylor & Zafman LLP

(57) ABSTRACT

A method and apparatus for delaying or hastening the "lifespan" of a session in response to detecting (or causing) a session renewal. A "session," refers to a particular user terminal's right of access to one or more communication channels to exchange data with the base station (and other devices/networks coupled thereto). A session renewal refers to an event or condition that delays the lapse/expiration of the session lifespan (i.e., extends the lifespan) or conversely, an event or condition that causes hastens the lapse of the session lifespan (i.e., causes an earlier lapse of the session). In one embodiment, a session represents the period of time in which a user terminal is registered with a base station and can thus access or attempt to access one or more wireless communication channels to exchange data with the base station. Therefore, a session "lifespan" represents a length of time subsequent to which, upon lapse of the lifespan, the session terminates and a remote user terminal must re-register with a base station to establish a session and to gain access to one or more wireless communication channels in which data may be exchanged between the user terminal and the base station.

25 Claims, 7 Drawing Sheets

METHOD AND APPARATUS FOR RESOURCE MANAGEMENT IN A WIRELESS DATA COMMUNICATION SYSTEM

FIELD OF THE INVENTION

The present invention relates to the field of wireless communications systems, and in particular, to a method and system for providing resource management in a wireless data communication system by varying (delaying or hastening) the lifespan of sessions in a wireless system in response to predetermined conditions/events.

BACKGROUND OF THE INVENTION

Wireless communications systems are evolving to provide enhanced data services, such as portable wireless access to the Internet and other data services, including broadband services, to wireless users. However, as the number of users in such systems grows, the number of resources, and in particular, communication channels that are available, typically become increasingly scarce. For instance, in a mobile wireless communication system, the number of wireless communication channels (e.g., frequency, time, space, and/or code channels) that a particular base station can support for exchanging data or voice information with a remote mobile or stationary user terminal in a given geographical area is finite and limited. As such, if all users access the resources of a wireless communication to begin, for example, a data exchange session at the same time, over-contention may occur, resulting in network inefficiency (e.g., wasted bandwidth), relatively low per-user bandwidth and/or relatively high per-user latency.

Therefore, it is desirable to provide a method and apparatus that enables management of resources, such as channels available for wireless communication, to prevent the above-described and other drawbacks with prior systems.

SUMMARY OF THE INVENTION

The present invention provides method and apparatus for establishing a (typically) finite duration session between a user terminal and a base station, and then delaying or hastening the "lifespan" of the session. In one embodiment, a session has associated therewith a session lifespan, which when lapsed in the absence of a session renewal, causes the session to terminate. However, if a session renewal is detected, the session lifespan is delayed or hastened.

DETAILED DESCRIPTION

Figure 1:
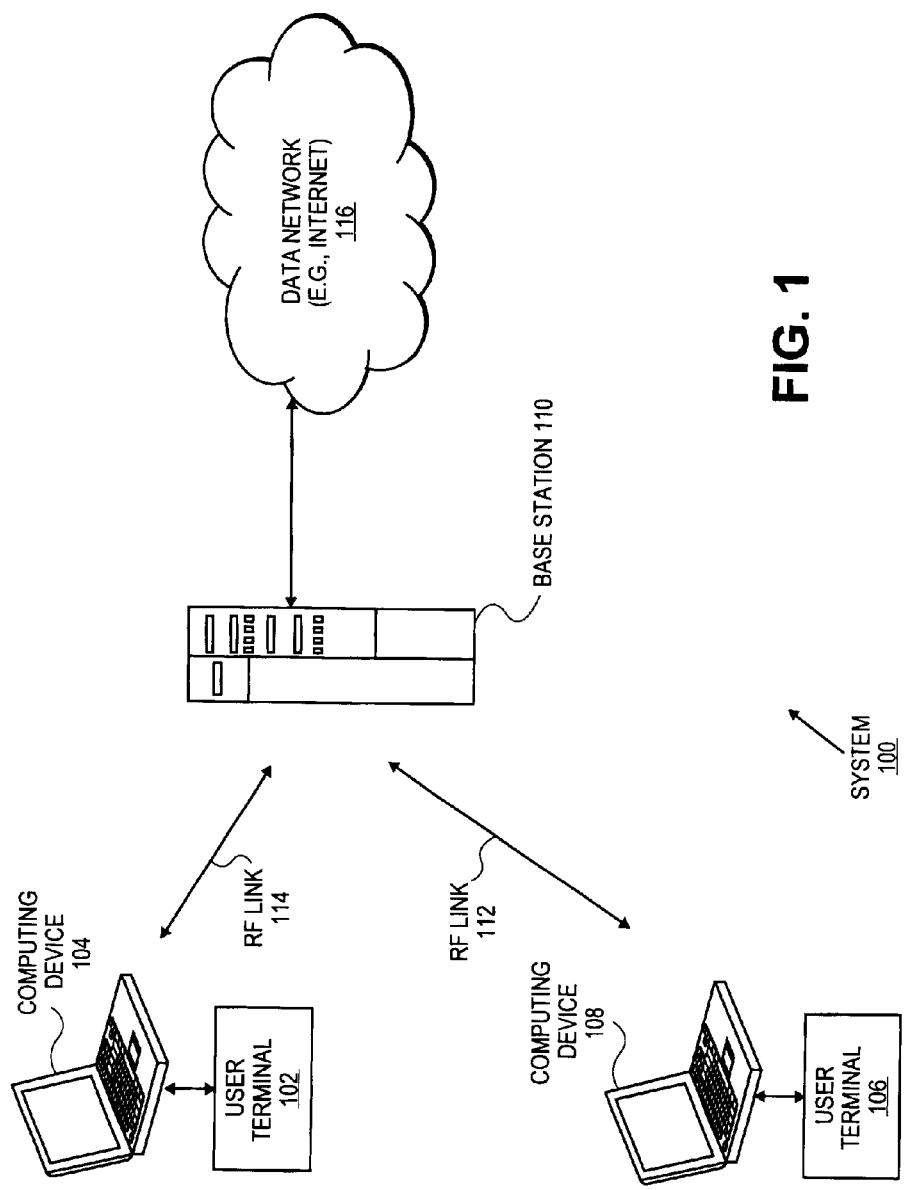
FIG. 1 is block diagram of a wireless system, according to one embodiment of the invention.

The present invention provides a method and apparatus for managing resources in a wireless communication system. In one embodiment, resource management is facilitated by providing a method and apparatus for extending or diminishing the "lifespan" of a "session" upon detecting a "session renewal"—i.e., an event or condition that delays the lapse/expiration of the session lifespan (i.e., extends the lifespan) or conversely, an event or condition that hastens the lapse of the session lifespan (i.e., causes an earlier lapse of the session). A "session," as used herein, refers to a particular user terminal's right or ability to access one or more (wireless) communication channels to exchange data vis-à-vis a wireless link with a base station (and other devices/networks coupled thereto). Such channels may represent particular time, frequency, code, or space channels utilized for wireless communication between a user terminal and a base station. In one embodiment, a session represents the period of time in which a user terminal is registered with a base station and can thus access one or more channels to exchange data with the base station. Therefore, a session "lifespan" represents a length of time subsequent to which, upon lapse of the lifespan, the session typically terminates and a remote user terminal must re-register with a base station to establish a session and to gain access to one or more wireless communication channels in which data may be exchanged between the user terminal and the base station.

The session lifespan may be set and monitored upon registration and/or at other times thereafter using a timing mechanism, such as a fixed, variable, random, or other length timer. Such a timing mechanism, in one embodiment, is included in both a user terminal and a base station, where both the user terminal and the base station timing mechanism are synchronized to inform the respective device of the lapse of the session lifespan. In another embodiment, rather than or in addition to a base station employing the timing mechanism, a session administrator (e.g., a computer system) may include the timing mechanism and the user terminal may or may not include a timing mechanism. Such a session administrator may be coupled to the base station (or several base stations). While in the described embodiment, both the user terminal and the base station (or other session administrator) include the timing mechanism, and such timing mechanisms are synchronized to provide information about the session lifespan (e.g., the beginning, any renewal, and the lapse of the lifespan) to the user terminal and the base station, respectively, in alternative embodiments, only the base station or only the user terminal may include a timing mechanism.

In one embodiment, once a remote user terminal registers with a base station, a session commences having a session lifespan or expiration that may be monitored by a timing mechanism of the user terminal, which in one embodiment, is synchronized with a timing mechanism of the base station or that of another session administrator coupled to the base station. Such timing mechanisms signal the lapse of a session lifespan and the resulting end of a session.

In accordance with one embodiment of the invention, a session will terminate upon lapse of the session lifespan as indicated by the timing mechanism, unless a session renewal is detected (by the base station, other session administrator and/or the user terminal, which may or may not include a timing mechanism). If a session renewal is detected, the session lifespan may be renewed for another time period, which may be equal to the original session lifespan or may be longer or shorter than the original lifespan. In one embodiment, upon detection of a session renewal, the timing mechanism (of the base station, session administrator, or user terminal) that monitors the session lifespan may be stopped, extended, shortened, reset, etc., to delay or extend lapse of the session lifespan. As such, contention, latency, bandwidth, and other limitations associated with limited resources, especially of a wireless communication system may be diminished by terminating sessions that have been idle for a given period of time (e.g., the lapse session lifespan), thereby freeing access rights to a wireless communication channel(s) for use by other sessions. In an wireless system wherein the number of active channels and/or sessions that a base station can simultaneously have idle or active, the present invention, according to one aspect, provides dynamic sessions that enable channel/session management.

In the following description, numerous specific details are set forth to provide a thorough understanding of the invention and its various embodiments. However, it should be appreciated that the invention may be practiced without these specific details. In other instances, well-known circuits, structures, and techniques have not been shown in detail in order to avoid obscuring the invention. It should further be noted that the various elements of the invention may be implemented in hardware (e.g., circuitry), software (e.g., machine-executable instructions), or a combination thereof. Furthermore, multiple general-purpose and/or digital signal processing (DSP) processors may be employed by a base station or user terminal of the present invention.

In one embodiment of the invention, each channel controlled by a base station can exist in one of four states: requesting, idle, active, or closed. Data is sent on the channel in the active state. In this embodiment, a user terminal initially registers with a base station and is assigned zero or more channels by the base station and a session commences. Initially, the base station places channels into the idle state. When registration occurs, the base station and the user terminal set their respective session timing mechanisms to time the session and indicate the lapse of the lifespan (and termination of the session) unless, as described, the session lifespan timing mechanism is reset, caused to lapse immediately or relatively sooner, stopped, and/or extended.

In one embodiment, the session lifespan is known to the user terminal and the base station (or other session administrator) even prior to registration; for example, the session lifespan is hard or soft-coded into the timing mechanism of each device, which may be a software or hardware-enabled count-up or count-down timer. In an alternative embodiment, the session lifespan is communicated between the user terminal and the base station during or after registration using wireless messaging, and thus, may be changed dynamically. For example, the timing mechanism configuration and length of the lifespan may be determined by a base station upon registration, based, for example, on a number of criteria such as the priority/quality-of-service (QOS) requirements of the particular user terminal, network congestion, wireless communication channel availability/allocation, number of "active" sessions, etc. In one embodiment, a user terminal periodically (at intervals shorter than the session lifespan) sends a session renewal or indication thereof to the base station while the user terminal is powered on. As such, in this embodiment, the user terminal's session may last as long as the user terminal is powered-on (or after its initial registration with a base station). Such periodical renewals, for example, may be allowed by the base station or other session administrator to select user terminals (e.g., those having high priority/QOS requirements, etc.)

Once a user terminal performs steps to register with a particular base station in which zero or more channels is assigned to the user terminal, a session commences and the session lifespan timing mechanism initiates. In one embodiment, the length of the session lifespan is known by the user terminal and the base station. For example, all user terminals may utilize the same lifespan or be assigned the same lifespan which may be coded into the base station (or other session administrator) and the user terminal. On the other hand, in an alternative embodiment, the lifespan may be set upon or after registration dynamically based on one or more criteria, such as those mentioned above. Similarly, channels that may be utilized by a user terminal may be known to the user terminal before power-up or registration, or may be communicated to the user terminal after power-up (e.g., before, during or after registration) in a configuration message or other messaging between the base station and the user terminal.

Subsequent to registration, and when a user terminal is to exchange data with the base station (and a device/network coupled thereto), the user terminal finds such a channel that it may utilize and which is in an idle state (e.g., as indicated by a state machine of the user terminal) and moves the channel into the requesting state. Accordingly, the user terminal transmits an "active channel" request to the base station.

In response to the request, the base station determines whether the channel is in fact in an idle state or being used by another user terminal or session (or otherwise unavailable to the requesting user terminal), and if it is in the idle state as indicated by the state machine of the base station, the base station moves the channel to the active state and notifies the user terminal, which in turn places the channel into the active state as well. In one embodiment, if the base station, in response to the active channel request, determines that the channel is not in the idle state or is otherwise unavailable, the base station doesn't notify the user terminal and the user terminal, after a predetermined time, attempts to make an active channel request for another channel and the above-described process is repeated until the base station confirms an active channel. In another embodiment, the base station simply finds another channel in the idle state in response to an active channel request and notifies the user terminal of the channel until both the user terminal and the base station have one or more channels in the active state.

The base station then transmits an acknowledgment to the user terminal informing the user terminal that the channel is in the active state and data exchange may occur thereafter. In one embodiment of the invention, the transition into an active channel state by the base station acts as a session renewal, thereby stopping, extending, delaying, or resetting the session lifespan timing mechanism of the base station (and that of the user terminal) that monitors the time lapse of the session lifespan. In one embodiment, the reset of the lifespan timing mechanism may be repeated one or more times until the active channel transitions to an idle state. In another embodiment, the session timing mechanism is merely stopped or paused by the transition into the active channel state, and then resumed after the channel state transitions into idle after the completion of data exchange between the user terminal and the base station.

In one embodiment, the base station detects when the user terminal ceases to send or receive data, and subsequently keeps the channel active for a relatively short period of time, e.g., 3 frames or 15 milliseconds in one embodiment, to account for any additional data that may need to be transmitted. Then, the base station moves the channel into the closed state, performs any "clean-up" operations, and then moves the channel into the idle state (where it may available to other sessions and/or other user terminals), at which time the lifespan timer may be restarted (if stopped or paused) and/or reset to the original or a different lifespan. If no renewal events are detected thereafter and before the lapse/expiration of the lifespan, the session will terminate and the user terminal will lose its right to access idle channels. Therefore, in one embodiment, the transition of the channel state from idle to active acts as a session renewal to stop, reset, extend, or otherwise delay the session lifespan. Similarly, in one embodiment, the transition of the channel state from active back to idle acts as a session lifespan resume/reset, assuming that it is the last or only channel that makes such a transition for the session; if additional channels for the session are still active, then the channel state, then the session lifespan will remain stopped (or otherwise delayed).

While the transition from idle channel state to active channel state has been described as one type of session renewal—i.e., an event or condition that causes the delay or hastening of the lapse of the session lifespan—in the above-described embodiment, other session renewal events may also occur or be detected at or subsequent to registration. For example, in one embodiment, quality-of-service (QOS) is used as a criterion to indicate the length of time for the session lifespan, as well to indicate whether the lifespan may be delayed/extended and for how long (and/or how many times). As such, if a particular user terminal is designated as one having high priority, that user terminal may be given, upon registration, longer or even limitless session lifespans, relative to other user terminals. For example, a base station or other session administrator coupled thereto may store information about the user terminal (and other user terminals) that indicate the QOS parameters of that user terminal and thus the length of the session lifespan. As such, the base station may assign different session lifespans to different user terminals, and such lifespans may even be limitless in some cases.

Similarly, in one embodiment, the base station (or other session administrator) may dynamically extend session lifespans based on wireless resources (e.g., if more than a predetermined number of channels are idle or less than a predetermined number of sessions exist or at particular times of the day) and similarly dynamically shorten session lifespans (e.g., if less than a predetermined number of channels are idle or more than a predetermined number of sessions exist or at particular times of the day). Moreover, the base station (or user terminal) may cause an immediate lapse of the session lifespan or otherwise end a session in response to certain events or conditions (e.g., too many sessions being idle or active at once, an order from a network administrator, or other event or condition).

In one embodiment, multiple sessions may exist simultaneously on one user terminal to facilitate wireless data exchange with a base station. In one embodiment, such sessions may utilize point-to-point protocol (PPP) and Internet Protocol (e.g., TCP/IP) or other data networking protocols to allow the user terminal to exchange data with a data network (e.g., the Internet and the World-Wide Web) vis-à-vis a wireless link/session established with a base station. Moreover, a session may utilize multiple wireless communication channels, and such channels may, in one embodiment, be shared between two or more user terminals using smart antenna processing at the base station and/or the user terminal. Such shared channels, in one embodiment, are considered two logical channels by the base station and the user terminal.

FIG. 1 is block diagram of a wireless system, according to one embodiment of the invention. In FIG. 1, a system 100 is shown in which a number of remote user terminals, such as remote user terminals 102 and 106, may exchange data via wireless RF links 114 and 112, respectively, with a base station 110, which in turn facilitates the exchange of such data with an external data network (e.g., the Internet) and the remote user terminals 102 and 106. In one embodiment, the base station 110 represents one of several base stations in a cellular system. The base station 110, in one embodiment, employs an antenna array and hardware and software to provide smart antenna processing. Such a base station, in one embodiment, may also employ spatial channels and spatial division multiple access (SDMA) technology, in which the user terminals 102 and 106 may simultaneously utilize the same time, frequency, and/or code channels to receive data (or voice information) from, or transmit data (or voice information) to, the base station 110. In alternative embodiments, the base station 110 does not necessarily utilize smart antenna processing or spatial channels. Moreover, a user terminal may also employ an antenna array and smart antenna or spatial processing.

The user terminals 102 and 106 are shown coupled to a computing device 104 and 108, respectively. As such, the user terminals 102 and 106 may represent wireless modems or other types of tranceiving hardware and software that enables a computing device, such as a laptop computer, personal digital assistant (PDA), gaming device, or other data processing appliance that may be portable to exchange data with a data network 116 via the base station 110. For example, the user terminal 102 may establish the RF link 114 (and corresponding session) with the base station 110 to exchange information between the computing device 104 and an Internet Service Provider (ISP), and thus provide access to the World Wide Web, an intranet, virtual private network (VPN) or other data network.

As used herein, "base station" refers to one or more devices that can communicate with a number of remote user terminals to facilitate the transfer of information between such user terminals and a data network coupled to the base station. The base station may operate in conjunction with one or more devices not shown in FIG. 1, such as a mobile telephone switching office (MTSO), data network switching, routing, administering, and/or tunneling equipment, session administrator, other base stations, or other devices that may facilitate exchange of information between one or more remote user terminals and a data network vis-à-vis a wireless link at least between the remote user terminal(s) and the base station. While the invention is described with reference to a wireless RF link between a user terminal and a base station, the base station in turn may be coupled to such other devices and ultimately a data network via hard-wired and/or wireless links.

Figure 2:
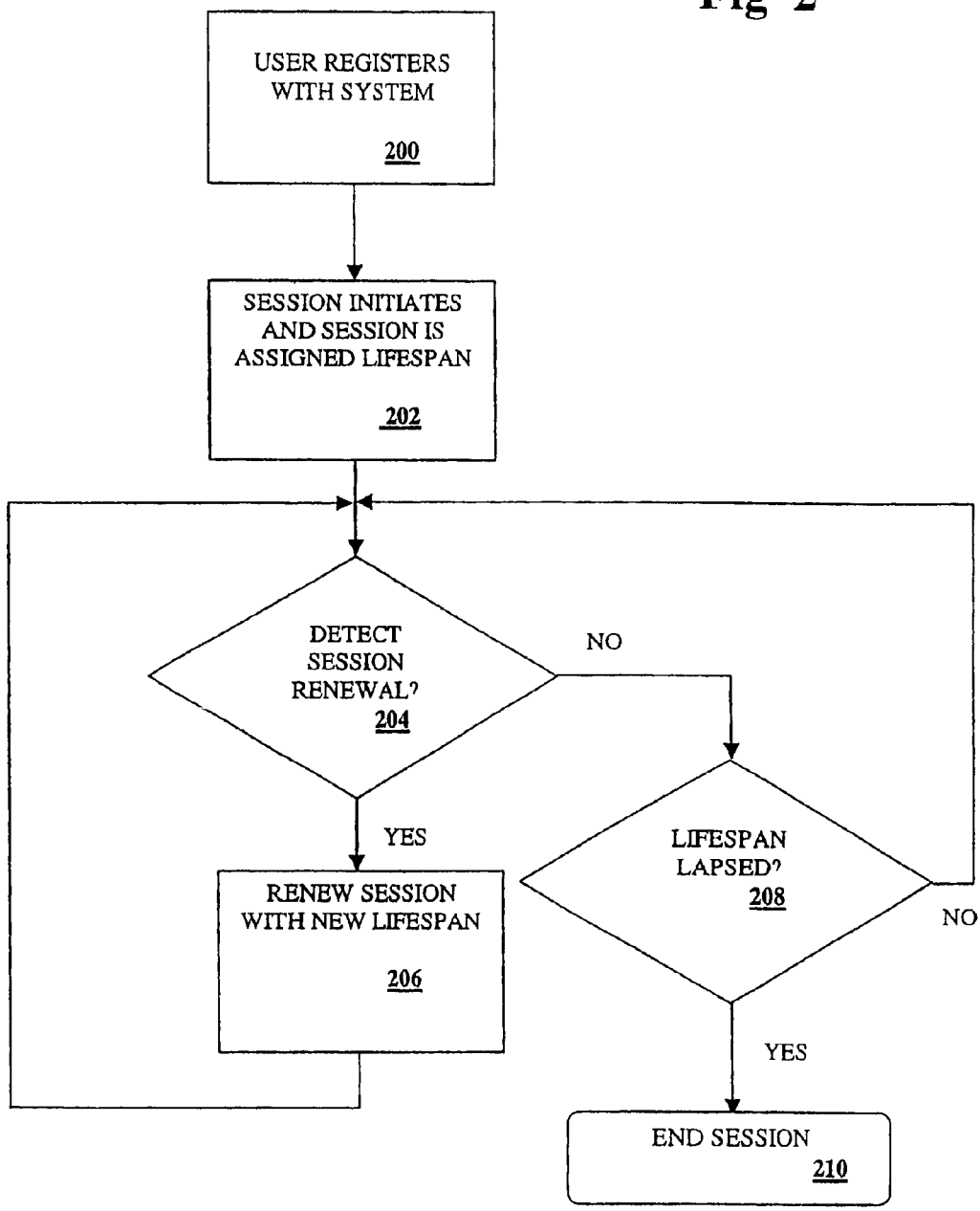
FIG. 2 is a flow diagram of a method for providing resource management in a wireless communication utilizing session renewals, according to one embodiment of the invention.

FIG. 2 is a flow diagram of a method for providing resource management in a wireless communication utilizing session renewals, according to one embodiment of the invention. In FIG. 2, a user (e.g., vis-à-vis a remote user terminal) registers with a base station at block 200. In one embodiment, registration occurs as a result of a series of exchanges and messages between the user terminal and a base station, for example, as described in U.S. patent application entitled, "RADIO COMMUNICATIONS SYSTEM WITH A MINIMAL BROADCAST CHANNEL", having Ser. No. 09/675,748, and filed Sep. 29, 2000, which is assigned to the assignee of the present application and which application is hereby incorporated by reference herein. However, in alternative embodiments, registration and session initiation may take place in accordance with other messaging protocols and the invention, therefore, may be utilized in various wireless system architectures.

At block 202, a session initiates having a session lifespan associated therewith. The base station (or other session administrator in communication therewith) includes a timing mechanism to monitor the session lifespan and the lapse thereof. Any one or a combination of known timing/counting mechanisms may be utilized to implement the timing mechanism. In one embodiment, a fixed or variable length software-implemented counter is utilized by the base station and the user terminal as the timing mechanism.

At block 204, it is determined if a session renewal is detected. For example, if a channel state transition from idle to active occurs.

If a session renewal is detected, at block 206, the session lifespan is renewed (e.g., paused, reset, extended, etc.), and in essence, the session lifespan is extended (or shortened, in some instances) and flow returns to block 204.

If a session renewal is not detected at block 204, then at block 208, if the session lifespan has not lapsed, flow returns to block 204. Otherwise, the session terminates at block 210, at which time the user terminal will not have the right of access to the idle channel(s) associated with that session.

Figure 3:
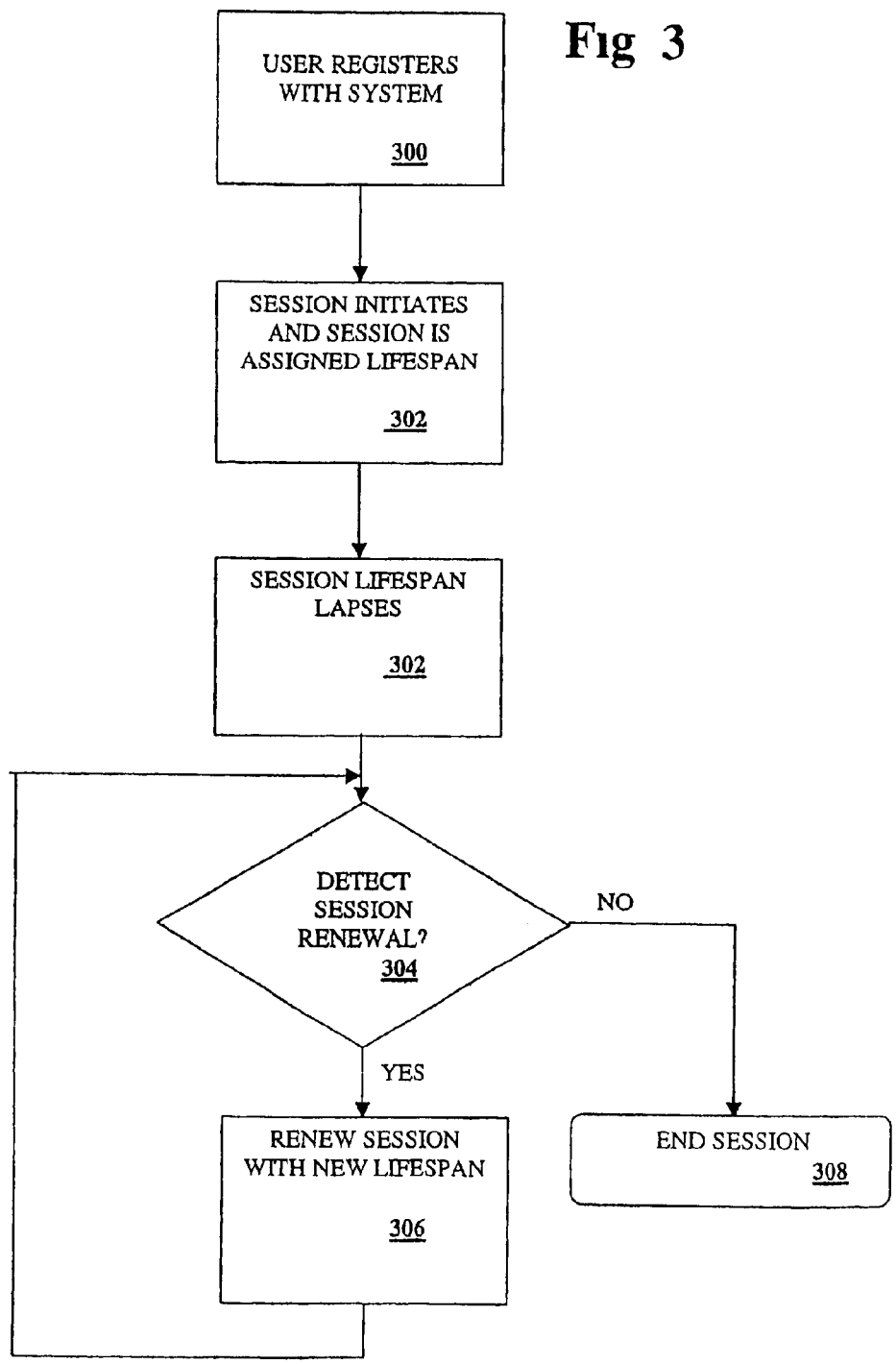
FIG. 3 is a flow diagram of a method for providing resource management in a wireless communication utilizing session renewals, according to an alternative embodiment of the invention.

FIG. 3 is a flow diagram of a method for providing resource management in a wireless communication utilizing session renewals, according to an alternative embodiment of the invention.

At block 300, a user registers with a base station.

At block 302, a session initiates and is "assigned" a lifespan. The lifespan may be predetermined (e.g., coded into the base station and/or the user terminal) or may be dynamic, such that it can be determined by the base station or other session administrator based on any one or a combination of criteria, for example, as described above.

At block 302, the session lifespan lapses.

However, in this embodiment, before terminating the session upon lapse of the session lifespan, at block 304, the base station (or other session administrator) determines if a session renewal has been detected (and for example, queued) and/or if a session renewal should be caused by the base station or session administrator, for example, because of an abundance of available channels, high priority/QOS associated with the user terminal, etc.

If so, then at block 306, the session lifespan is renewed (e.g., extended or reset with same or different length) and flow returns to block 304.

If at block 304 a session renewal is not detected or caused, then the session terminates at block 308.

Figure 4:
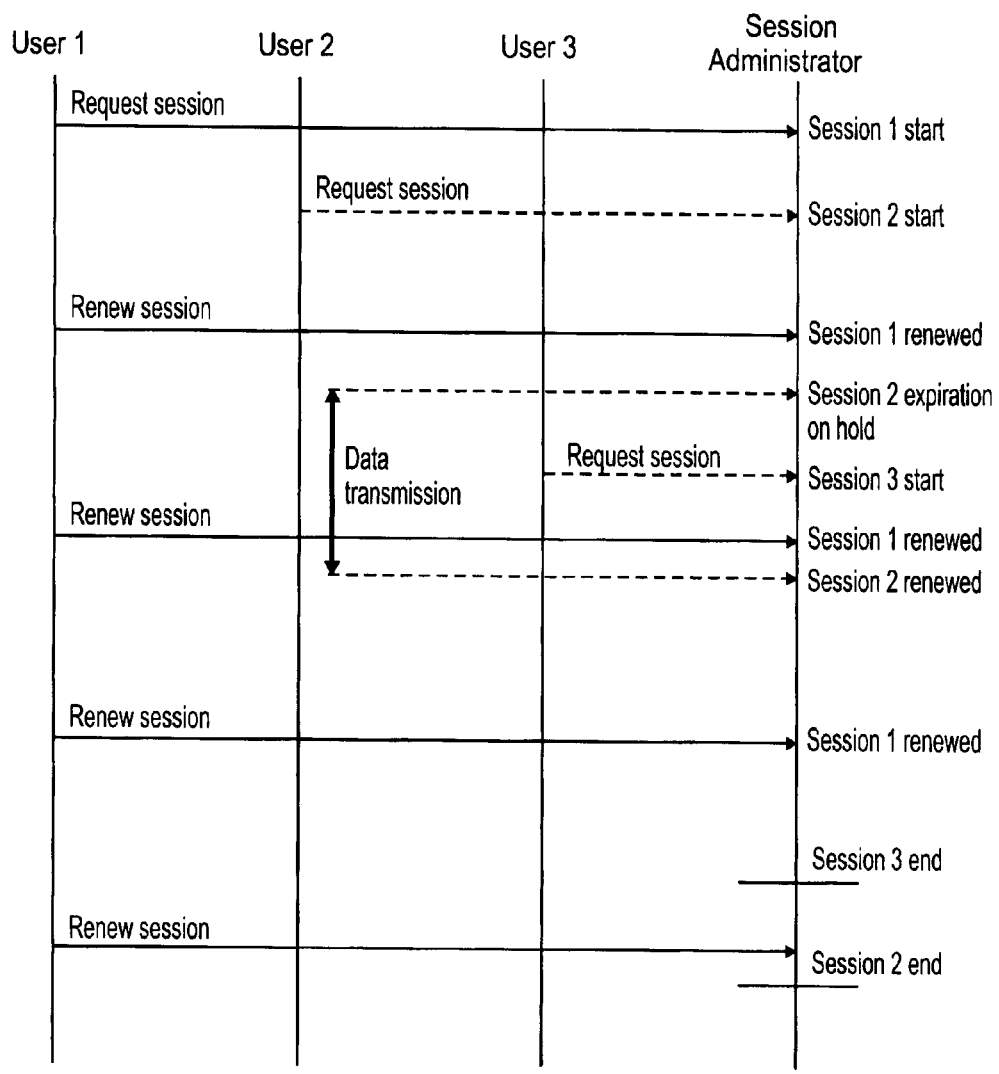
FIG. 4 is a diagram illustrating a method and system for resource management in wireless communication system utilizing dynamic session renewals, in accordance with one embodiment of the invention.

FIG. 4 is a diagram illustrating a method and system for resource management in wireless communication system utilizing dynamic session renewals, in accordance with one embodiment of the invention. As shown in FIG. 4, in which time lapse is depicted in a downward direction, a user terminal and/or a session administrator (e.g., a base station or other device(s) coupled thereto) can cause session renewals.

HARDWARE OVERVIEW

Figure 5:
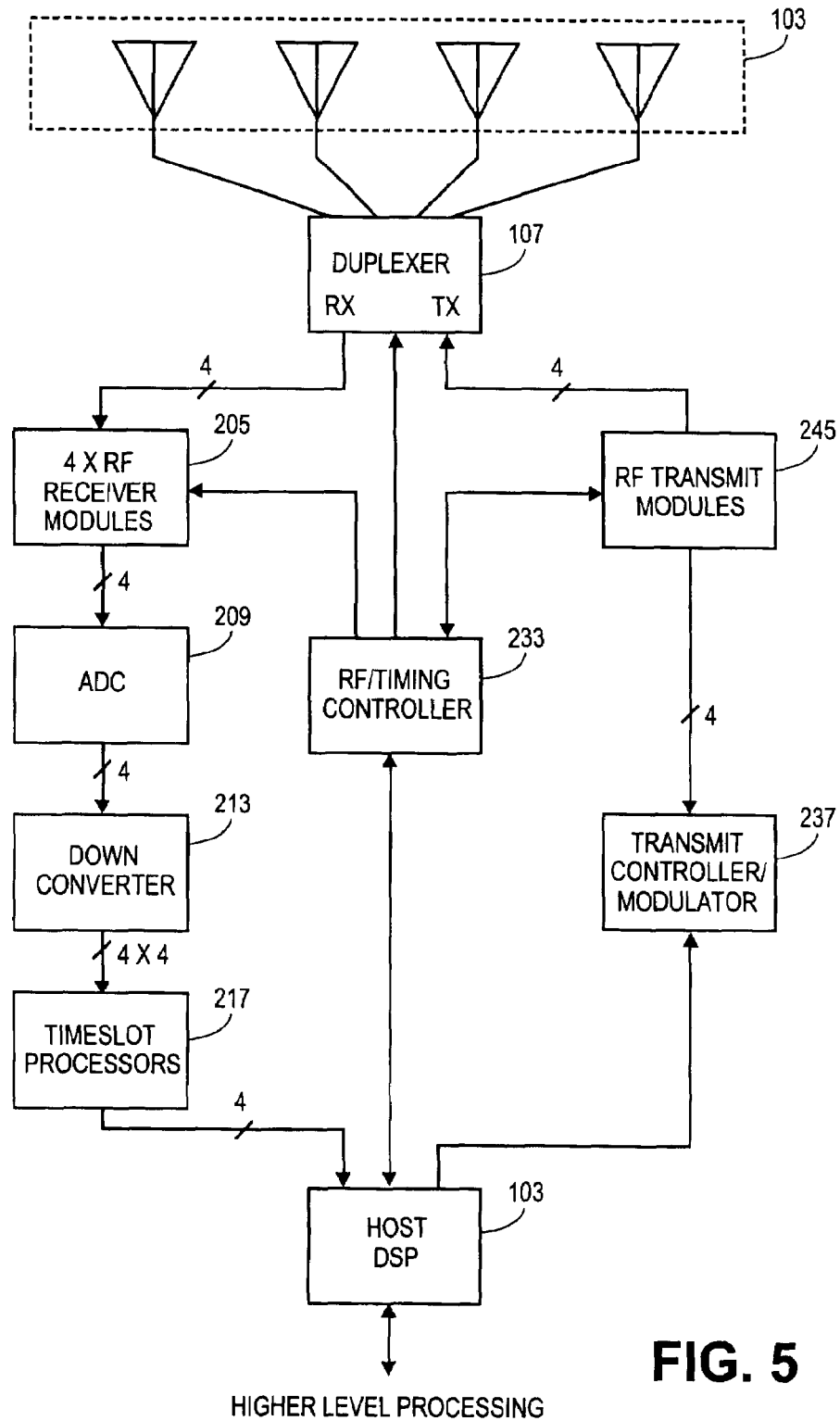
FIG. 5 shows an example of a base station of a wireless communications system or network suitable for implementing the present invention, in accordance with one embodiment.
Figure 6:
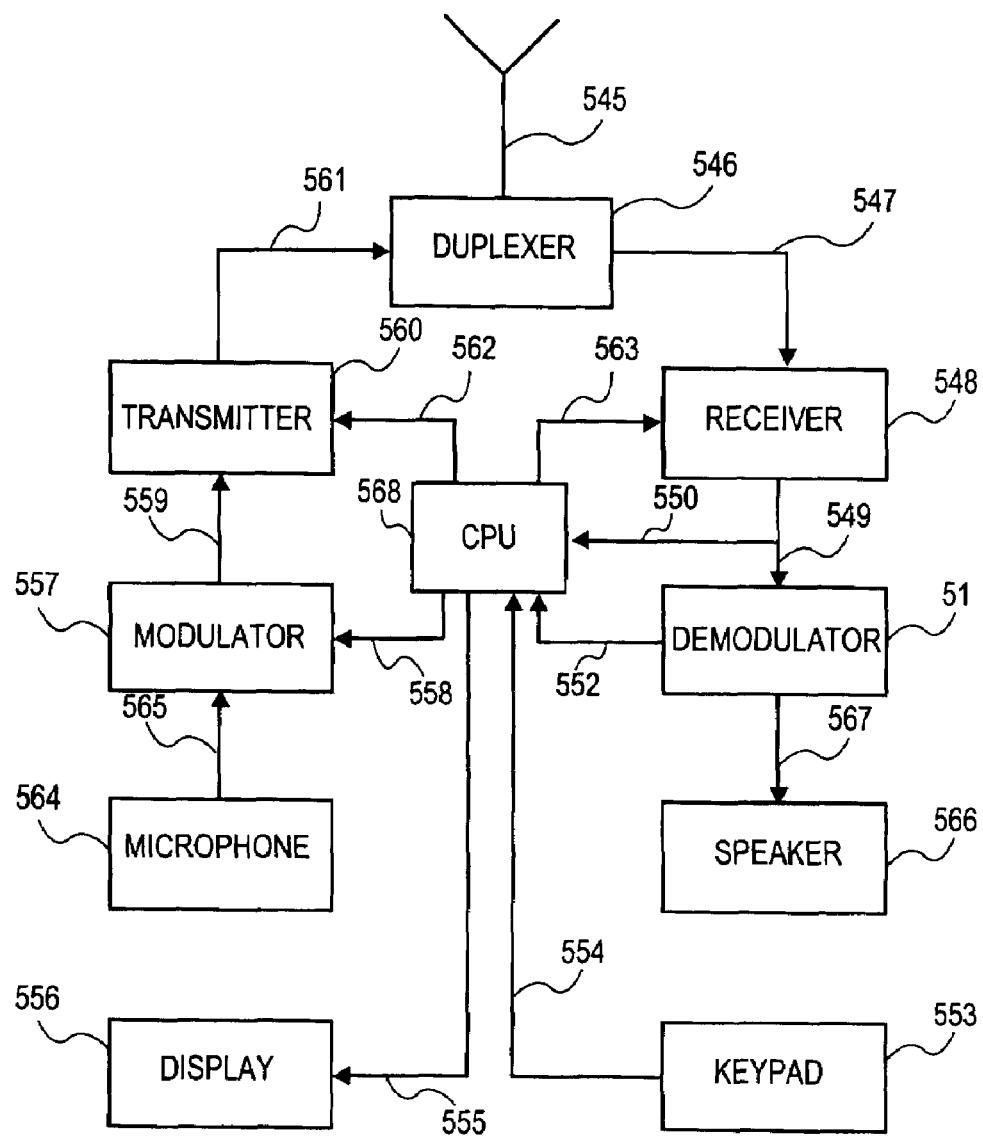
FIG. 6 depicts an example component arrangement in a user terminal that provides data or voice communication, in accordance with one embodiment of the invention.
Figure 7:
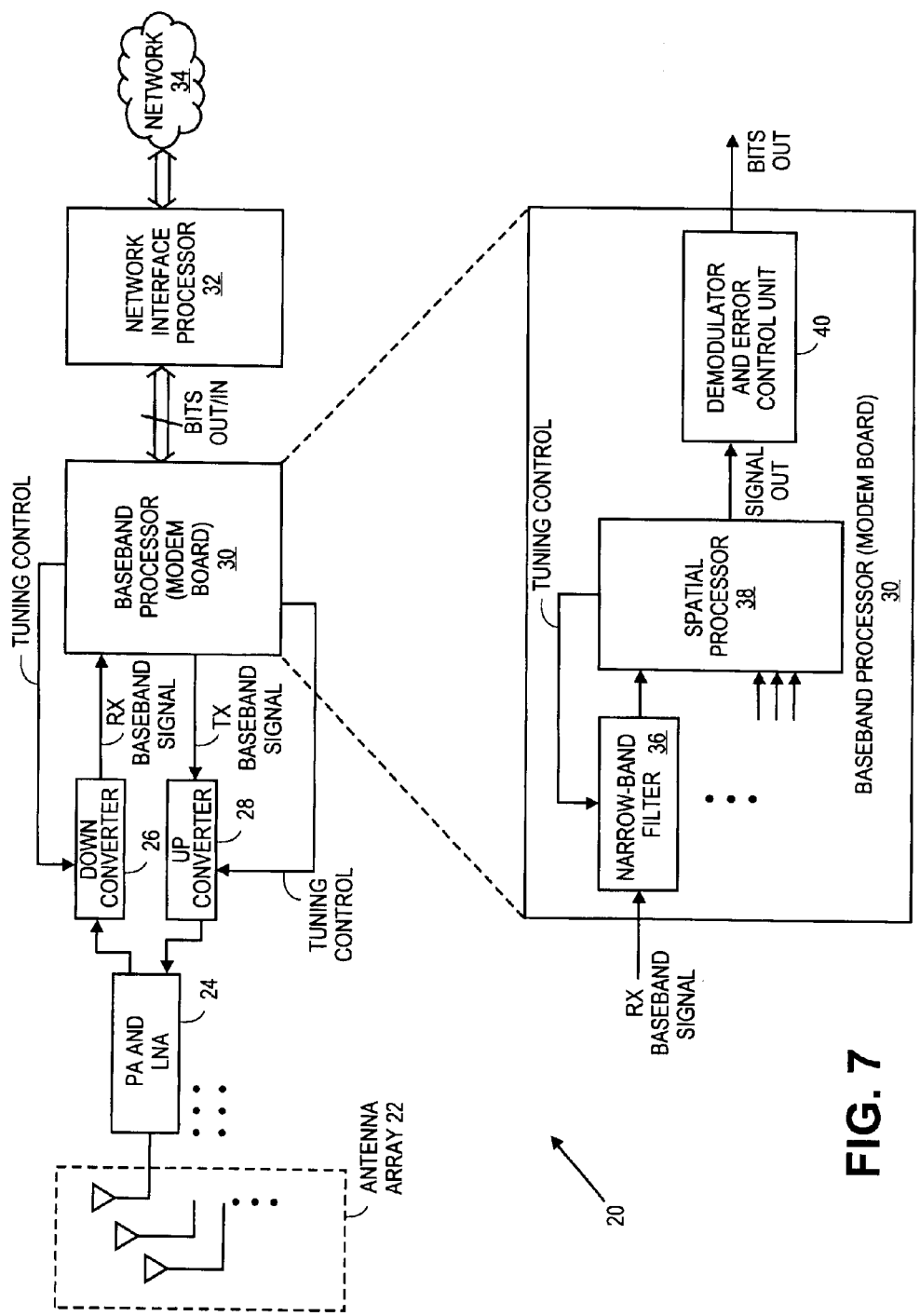
FIG. 7 is a block diagram of a base station employing smart antenna technology and a session timing and renewal mechanism, according to one embodiment of the invention.

Although it should be appreciated that the present invention may be useful in and thus embodied in various wireless or even wired systems, in which base stations, mobile or stationary user terminals, and the overall system can have various hardware/software configurations, FIGS. 5-7 depict exemplary architectures for communication devices that may employ the method and apparatus of the present invention in accordance with one or more embodiments of the invention.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD).

FIG. 5 shows an example of a base station of a wireless communications system or network suitable for implementing the present invention, in accordance with one embodiment. The system or network includes a number of subscriber stations, also referred to as remote terminals or user terminals, such as that shown in FIG. 6. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Final down-converting to baseband is carried out digitally. The down-converting can be done using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, one embodiment employs three timeslots for the uplink and downlink in each frame. Referring to the embodiment depicted in FIG. 5, for each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56311 DSPs can be used as timeslot processors, one per receive timeslot. The timeslot processors 217 monitor the received signal power and estimate the frequency offset and time alignment. They also determine smart antenna weights for each antenna element. These are used in the spatial division multiple access scheme to determine a signal from a particular remote user and to demodulate the determined signal.

The output of the timeslot processors 217 is demodulated burst data for each of the four receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error detecting code, and deconstructs bursts of the uplink signals, then formats the uplink signals to be sent for higher level processing in other parts of the base station. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received data bits are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245. The transmit modules 245 up-convert the signals to the transmission frequency and amplify the signals. The amplified transmission signal outputs are sent to antennas 103 via the duplexer/time switch 107.

FIG. 6 depicts an example component arrangement in a user terminal that provides data or voice communication, in accordance with one embodiment of the invention. The user terminal's antenna 545 is connected to a duplexer 546 to permit antenna 545 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 546. In another alternate embodiment, where time division duplexing is used, a transmit/receive (TR) switch can be used instead of a duplexer as is well-known in the art. The duplexer output 547 serves as input to a receiver 548. The receiver 548 produces a down-converted signal 549 which is the input to a demodulator 551. A demodulated received sound or voice signal 567 is input to a speaker 566.

The user terminal has a corresponding transmit chain in which data or voice to be transmitted is modulated in a modulator 557. The modulated signal to be transmitted 559, output by the modulator 557, is up-converted and amplified by a transmitter 560, producing a transmitter output signal 561. The transmitter output 561 is then input to the duplexer 546 for transmission by the antenna 545.

The demodulated received data 552 is supplied to a user terminal central processing unit 68 (CPU) as is received data before demodulation 550. The user terminal CPU 568 can be implemented with a standard DSP (digital signal processor) device such as a Motorola series 56300 DSP. This DSP can also perform the functions of the demodulator 51 and the modulator 557. The user terminal CPU 568 controls the receiver through line 563, the transmitter through line 562, the demodulator through line 52 and the modulator through line 558. It also communicates with a keyboard 553 through line 554 and a display 556 through line 555. A microphone 564 and speaker 566 are connected through the modulator 557 and the demodulator 551 through lines 565 and 566, respectively for a voice communications user terminal. In another embodiment, the microphone and speaker are also in direct communication with the CPU to provide voice or data communications.

The user terminal's voice signal to be transmitted 565 from the microphone 564 is input to a modulator 557. Traffic and control data to be transmitted 558 is supplied by the user terminal's CPU 568. Control data 558 is transmitted to base stations during registration, session initiation and termination as well as during the session or stream.

In an alternate embodiment, the speaker 566, and the microphone 564 are replaced or augmented by digital interfaces well-known in the art that allow data to be transmitted to and from an external data processing device (for example, a computer). In one embodiment, the user terminal's CPU is coupled to a standard digital interface such as a PCMCIA interface to an external computer and the display, keyboard, microphone and speaker are a part of the external computer. The user terminal's CPU 568 communicates with these components through the digital interface and the external computer's controller. For data only communications, the microphone and speaker can be deleted. For voice only communications, the keyboard and display can be deleted.

FIG. 7 is a block diagram of a base station employing smart antenna technology and a session timing and renewal mechanism, according to one embodiment of the invention. As shown, a system 20, which may be part of a base station, in one embodiment, includes an antenna array 22, which in turn includes a number of antenna elements. The antenna array 22 is utilized for transmitting a downlink signal to a remote user terminal and for receiving an uplink signal from the remote user terminal. Of course, the system 20 may communicate with several remote user terminals, and as such, may process a number of signals each associated with a remote user terminal or other signal source. Furthermore, the system 20 may be employed in each of several base stations in a wireless communication network, where each base station uses a given set of channels to communicate with remote user terminal units within a given geographic region. Such remote user terminals may be stationary or mobile, and may communicate voice and/or data with the system 20 using PPP, TCP/IP and/or other data or voice protocols. In one embodiment, each such remote user terminal is coupled to an external data processing device (e.g., a laptop computer, a PDA, a gaming device or other computing device) using an Ethernet or PPP-over-Ethernet (PPPoE) connection to allow such device to exchange data with the system 20 vis-à-vis a wireless communication link established between the user terminal and the system 20.

As shown in FIG. 7, each antenna element of the antenna array 22 is coupled to a power amplifier (PA) and low-noise amplifier (LNA) 24. The PA/LNA 24 of each antenna element amplifies the received (uplink) and/or transmitted (downlink) signal. As shown, each PA/LNA 24 is coupled to a down-converter 26 and an up-converter 28. The down-converter 26 converts the "raw" signal received by the antenna array 22 on a carrier frequency into a receive (Rx) baseband signal, which is provided to a baseband processor (also referred to as a modem board) 30. The up-converter 28, conversely, converts a transmit (Tx) baseband signal provided by the baseband processor 30 into a carrier frequency transmit signal, which is provided to the PA/LNA 24 to be transmitted (e.g., to a remote user terminal). Although not shown, analog-to-digital conversion (ADC) and digital-to-analog (DAC) circuitry may be coupled between the down-converter 26 and the baseband processor 30 and between the up-converter 28 and the baseband processor 30, respectively.

The baseband processor 30 typically includes hardware (e.g., circuitry) and/or software (e.g., machine-executable code/instructions stored on a data storage medium/device) to facilitate processing of received (uplink) and transmitted (downlink) signals. In accordance with the embodiment of the invention shown in FIG. 7, the baseband processor 30 includes at least one narrow-band filter 36 filter to filter received signals either in analog or digital form. The filtered signal from the narrow-band filter 36, in turn, is provided to a spatial processor 38.

The spatial processor 38 typically includes at least one general purpose processor and/or digital signal processor (DSP) to facilitate spatial or spatio-temporal processing. In one embodiment, the spatial processor 38, based on the spatial or spatio-temporal characteristic(s) (also known as a "spatial signature") of one or more uplink signals, is able to transmit and receive signals between one or more remote user terminals in a spatially selective manner. Accordingly, in one embodiment where spatial channels and SDMA is utilized, two or more remote user terminals may simultaneously receive and/or transmit on the same channel (e.g., carrier frequency and/or time slot and/or code) but may be distinguishable by the system 20 based on their unique spatial or spatio-temporal characteristic(s). However, in alternative embodiments of the invention, spatial channels may not be employed. One example of a spatial characteristic is direction of arrival (DOA) or angle of arrival (AOA). Other types of spatial characteristics known in the art of adaptive arrays may be employed in conjunction with the present invention.

In general, the antenna array 22 facilitates transfer of signals between the system 20 and a desired remote user terminal and/or one or more other devices (e.g., a plurality of remote user terminals, other base stations in a wireless communication network, a satellite communication network, etc.). For example, the antenna array may transmit downlink signals to the desired remote user terminal, and receive uplink signals from the remote user terminal. Such transmission and reception may occur in the same frequency channel but at different times (e.g., in a TDD system) or may occur at different frequencies (e.g., in an FDD) system. The processor 38 determines the spatial characteristic(s) of the uplink signal from the desired remote user terminal, also referred to herein as a primary remote user terminal, as well as the spatial characteristic(s) of one or more other non-primary remote user terminals. Based on such characteristics, the system 20 determines a downlink beamforming strategy to enhance its transmission gain at the location of the desired remote user terminal, while relatively minimizing its transmission gain (i.e., providing a "null" or interference mitigated region) at the location of the non-primary remote user terminal(s). Similarly, the system 20, based on the spatial characteristics, may perform uplink beamforming to enhance its reception gain from the location of the primary remote user terminal, while minimizing its reception gain from the location(s) of one or more non-primary remote user terminals.

In one embodiment of the invention, the system 20 supports spatial channels, such that two or more remote user terminals in communication with the system 20 may simultaneously employ the same conventional frequency and/or time channel. In alternative embodiments, however, spatial channels may not be supported or utilized or may be utilized only when one or more conditions are met.

As shown in FIG. 7, the spatial processor 38 is further coupled to a demodulator and error control unit 40, which receives an "extracted" or "desired" signal or set of signals from the spatial processor 38, and outputs the extracted signal to a network processor 32. The unit 40 may perform error correction, provide packet overhead, and/or perform other processing before outputting the uplink information in the form of digital data to the network processor 32.

The network processor 32, which may or may not constitute part of the system 20, facilitates the transfer of information between the system 20 and an external network 34, which, for example, may represent the Internet, in which case the system 20 may be coupled (through wireless and/or wired links) to an Internet Service Provider (ISP). Such information may include voice and/or data and may be transferred in a packet-switched or circuit-switched manner. For example, in one embodiment, a remote user terminal may include a cellular telephone, two-way pager, PDA with wireless communication capability, a wireless modem that may be interfaced to a data processing device, such as a laptop computer, PDA, gaming device or other computing device, or other communication device to facilitate routing voice and/or data signals between the remote user terminal(s) and the network 34, which in this example may include the public switched telephone network (PSTN), the Internet, and/or other voice and/or data network. Thus, the remote user terminal may include or be interfaced with a computing device (e.g., a portable digital assistant, a laptop/notebook computer, a computing cellular telephone handset, etc.), along with a Web-browser, in which case the network 34 may represent the Internet and the network interface processor may facilitate communication between the remote user terminal (via the system 20) and one or more servers or other data processing systems coupled to the Internet. As such, voice and/or data (e.g., video, audio, graphics, text, etc.) may be transferred between the system 20 (and one or several remote user terminals in communication therewith) and an external network 34.

The structures shown in FIGS. 5-7 may each include, in accordance with one embodiment of the invention, timing mechanisms (e.g., a software and/or hardware-implemented) timer/counter to monitor session lifespans and indicate the lapse of sessions.

The present invention includes various steps. The steps of the present invention may be performed by hardware components, such as those shown in FIGS. 5-7, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets or other user terminal devices (e.g., wireless modems that may be interfaced with various portable data processing devices), it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

Although the invention has been described with reference to several embodiments, it will be appreciated that various alterations and modifications may be possible without departing from the spirit and scope of the invention, which is best understood by the claims that follow.

What is claimed is:

1. A method comprising:
   a communication device establishing a wireless communication session with a remote user terminal, the wireless communication session having associated therewith a session time limit;
   the communication device detecting a session renewal; and
   the communication device altering the session time limit in response to detecting the session renewal.

2. The method of claim 1, wherein the session renewal is caused by a priority status associated with the remote user terminal.

3. The method of claim 2, wherein the communication device detecting a session renewal further comprises the communication device receiving an indication of the priority status from the remote user terminal.

4. The method of claim 1, wherein the session renewal is caused by the communication device detecting active data exchange between the remote user terminal and the communication device prior to a lapse of the session time limit.

5. The method of claim 1, wherein the communication device altering the session time limit comprises the communication device extending the session time limit by a time equal in duration to the original duration of the session time limit.

6. The method of claim 1, wherein the communication device detecting the session renewal comprises the communication device receiving a session renewal from the remote user terminal.

7. The method of claim 1, wherein the session renewal is generated by the communication device.

8. In a communication system, a method comprising:
   a communication device providing a session to a remote user terminal, the session having associated therewith a first session time limit;
   the communication device determining whether a session renewal has been generated; and
   upon lapse of the first session time limit, the communication device, if having determined that a session renewal has been generated, renewing the session for a second session time limit, and if having determined that a session renewal has not been generated, terminating the session.

9. The method of claim 8, wherein the session renewal is caused by a priority status associated with the remote user terminal.

10. The method of claim 9, wherein the communication device determining whether a session renewal has been generated further comprises the communication device receiving an indication of the priority status from the remote user terminal.

11. The method of claim 8, wherein the session renewal is caused by the communication device detecting active data exchange between the remote user terminal and a data network coupled to the communication device upon lapse of the session time limit.

12. The method of claim 8 wherein the first and second session time limits are equal in duration.

13. The method of claim 8, wherein the session renewal is received by the communication device from the remote user terminal.

14. The method of claim 8, wherein the session renewal is generated by the communication device.

15. An apparatus for managing communication channels in a wireless communication system, the apparatus comprising:
   a session lifespan means for providing a time limit to a communication session with an external device, the communication session characterized by an ability of the external device to have access to wireless communication channels for exchanging data, the session lifespan means further for detecting a session renewal by determining whether a predetermined condition results in a session renewal; and
   a session management means for altering the time limit in response to the predetermined condition.

16. The apparatus of claim 15, wherein the session lifespan means includes a timing mechanism to indicate lapse of the time limit.

17. The apparatus of claim 16, wherein the session management means is coupled to the timing mechanism, and wherein the session management means altering the time limit in response to the predetermined condition comprises the session management means indicating to the timing mechanism to delay or extend the time limit in response to the predetermined condition.

18. The apparatus of claim 15, wherein the session management means for altering the time limit in response to the predetermined condition further includes the session management means detecting at least one channel utilized by the external entity for data exchange.

19. The apparatus of claim 15, wherein the session management means for altering the time limit in response to the predetermined condition further includes the session management means detecting network congestion.

20. The apparatus of claim 19, wherein network congestion is characterized at least in part by a number of sessions open.

21. The apparatus of claim 19, wherein network congestion is characterized at least in part by a number of channels that are active.

22. The apparatus of claim 15, wherein the predetermined condition is caused by a message received from the external entity.

23. The apparatus of claim 15, wherein the predetermined condition is caused by an event generated by the session management means.

24. The apparatus of claim 15, wherein the time limit is determined based at least in part on a quality-of-service parameter of the external entity.

25. The apparatus of claim 15, further comprising means for exchanging data with said external entity and an external data network.

* * * * *